United States Patent [19]
Gabb

[11] Patent Number: 5,673,742
[45] Date of Patent: Oct. 7, 1997

[54] AUTOMOBILE SHADE ASSEMBLY

[76] Inventor: Paul C. Gabb, 4828 Belle Dr., Metarie, La. 70006

[21] Appl. No.: 588,861

[22] Filed: Jan. 19, 1996

[51] Int. Cl.⁶ ............................................. B60J 3/00
[52] U.S. Cl. .................. 160/370.22; 160/24; 248/224.8; 296/97.8
[58] Field of Search ...................... 160/24, 370.22, 160/903, 370.21, 354, 368.1; 296/97.8, 97.9; 248/480, 224.8

[56] References Cited

U.S. PATENT DOCUMENTS

| | | | |
|---|---|---|---|
| 2,772,547 | 12/1956 | Voss | 160/23.1 X |
| 3,454,300 | 7/1969 | Pugsley et al. | 160/370.22 X |
| 3,719,220 | 3/1973 | Small | 160/23.1 X |
| 3,905,484 | 9/1975 | Dean et al. | 248/224.8 X |
| 4,647,102 | 3/1987 | Ebrahimzadeh | 296/97 D |
| 4,660,793 | 4/1987 | Mark | 248/224.8 |
| 4,775,180 | 10/1988 | Phillips | 160/84.1 |
| 5,054,533 | 10/1991 | Lii | 160/23.1 X |
| 5,078,194 | 1/1992 | Phillips | 160/84.1 |
| 5,344,206 | 9/1994 | Middleton | 296/97.8 |

FOREIGN PATENT DOCUMENTS 2246408  5/1975  France ............................ 160/370.22

*Primary Examiner*—Blair Johnson
*Attorney, Agent, or Firm*—Joseph N. Breaux

[57] ABSTRACT

An automobile shade assembly is provided of the type attachable to the interior of a window of an automobile for protecting the interior of the automobile from solar radiation is provided. The automobile assembly includes: a mounting plate adapted for mounting to the interior of a window of an automobile, a triangular housing detachably connectable to the mounting plate, an axle rotatively mounted within the housing, a sun shade having a rear edge connected to the axle and a forward edge extending from the housing, a first fastener connected to the sun shade adjacent the forward edge thereof, and a second fastener adhered to the window of the vehicle a distance from the housing such that a portion of the window is covered by the sun shade when the first fastener and second fastener are interconnected.

2 Claims, 1 Drawing Sheet

AUTOMOBILE SHADE ASSEMBLY

TECHNICAL FIELD

The present invention relates to devices for shielding the interior of an automobile from solar radiation and more particularly to devices having a retractable shade for protecting the interior of an automobile from solar radiation that are detachably mountable to the interior of a window of an automobile.

BACKGROUND ART

The use of automotive sun shades is known in the prior art. More specifically, automotive sun shades which are retractable are known to consist basically of familiar, expected and obvious structural configurations, notwithstanding the myriad of designs encompassed by the crowded prior art which have been developed for the fulfillment of countless objectives and requirements.

Many of the prior art shades include a foldable sheet of cardboard which may be held in place against the windshield of the vehicle when needed and then removed and folded up when driving. These devices are cumbersome and commonly only for use in covering the front windshield of a vehicle.

Some of the prior art devices are attachable directly to the window of vehicle and have retractable shades. Many of these devices require bulky frames which are expensive, unattractive and may block the view of the driver when mounted. In addition, these devices are often only available for use on the front windshield or rear window of a vehicle.

It would be a benefit, therefore, to have an automobile shade assembly that may be mounted to any window on a vehicle that has a sun shade which may be extended therefrom and fastened to the window of the vehicle to protect the interior of the vehicle from the sun's radiation. It would be a further benefit to have a sun shade that automatically retracts into a housing when unfastened from the window of the vehicle. It would be a still further benefit to have a sun shade assembly that has a low profile allowing the driver of the vehicle an unobstructed view when the assembly is not in use. It would be an additional benefit to have a housing retractably containing the sun shade therein which may be detached from the window when desired.

GENERAL SUMMARY DISCUSSION OF INVENTION

It is thus an object of the invention to provide an automobile shade assembly that has a sun shade retractable mounted within a housing that is detachably mountable to an automobile window.

It is a further object of the invention to provide an automobile shade assembly that has a housing for storing the retractable sun shade that presents a low profile thereby not obstructing the view of the driver of a vehicle when the sun shade is retracted.

It is a still further object of the invention to provide an automobile shade assembly that has a housing containing the retractable sun shade that may be easily and quickly connected to any of the windows in a vehicle depending on the direction of the sun's rays.

It is a still further object of the invention to provide an automobile shade assembly that is inexpensive to manufacture and easy to install without having bulky frameworks which impair a driver's view while driving and providing an automobile shade which has all the advantages of the prior art and none of the disadvantages.

Accordingly, an automobile shade assembly is provided of the type attachable to the interior of a window of an automobile for protecting the interior of the automobile from solar radiation is provided. The automobile assembly includes: a mounting plate adapted for mounting to the interior of a window of an automobile, a triangular housing detachably connectable to the mounting plate, an axle rotatively mounted within the housing, a sun shade having a rear edge connected to the axle and a forward edge extending from the housing, a first fastener connected to the sun shade adjacent the forward edge thereof, and a second fastener adhered to the window of the vehicle a distance from the housing such that a portion of the window is covered by the sun shade when the first fastener and second fastener are interconnected.

The mounting plate is rectangular in shape and constructed of plastic. The mounting plate has a first plate side and a second plate side. The plate is mounted longitudinally along a lateral edge of a window of the vehicle by placing an adhesive such as double sided tape between the first plate side and the window. Preferably, the mounting plate is made of a transparent plastic so that when the housing is detached the mounting plate want obstruct the driver's view.

The triangular housing has a base wall, a top wall, a front wall, a first sidewall and a second sidewall. The top wall extends substantially at a right angle from the base wall, the front wall extends from the top wall to the base wall forming a slit therebetween. The first and second sidewalls connect the base, top and front walls on either end of the housing. The housing is constructed of plastic and has a length and width approximating that of the mounting plate. The housing is attached to the mounting plate with the top wall facing outwardly from the window and with the front wall sloping downwardly towards the window. In this manner when the sun shade is extended from the housing it contacts the window. In addition, mounting the triangular housing in his manner allows the driver or a passenger to clearly see out of the window when the shade is retracted.

The sun shade is constructed of a rectangular sheet of flexible material. Preferably, the sun shade is constructed of a durable plastic having a reflective surface. The sun shade is preferably of a length sufficient to cover the entire surface of the front windshield of a motor vehicle when extended. The forward edge of the sun shade may have a rigid stiffening member attached thereto. Tabs may be attached to the forward edge of the shade to provide a means of extending the shade from the housing.

Connected to the sun shade adjacent to the forward edge are first fasteners. Preferably, there are a plurality of fasteners evenly spaced along the forward edge. The first fasteners are interconnectable with second fasteners which are attached to the window by an adhesive. Preferably the first and second fasteners are compatible hook and pile type fasteners. In a preferred embodiment using a single shade assembly to cover a windshield of a vehicle the housing is mounted longitudinally adjacent the left edge of the windshield and the second fasteners are attached to the windshield adjacent the right edge of the windshield.

Preferably a mechanism is attached to the axle for rolling the sun shade onto the axle retracting the shade into the housing. The retraction may be a handle attached to the end of the axle providing a means for the user to manually rotate the axle. More preferably, the retraction mechanism is spring connected between the axle and the housing rotating the axle in a first angular direction retracting the shade when the first and second connectors are not connected.

The housing is detachably connected to the mounting plate by interconnecting first connectors extending from the base wall of the housing and second connectors extending from the second plate side of the mounting plate. Preferably, there are a plurality of connectors for connecting the housing to the mounting plate in a stable manner.

In a preferred embodiment the first connector is a substantially rectangular member having a slot formed about its perimeter approximate the midpoint thereof. The second connector forms a T-shaped recess having a first rectangular section for disposing the first connector, and a second elongated section having a lip extending about its perimeter defining a trackway between the lip and the second plate side. The first and second connector are interconnected by inserting the first connector into the first rectangular section and then sliding the first connector into the second elongated section entrapping the lip within the slot.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
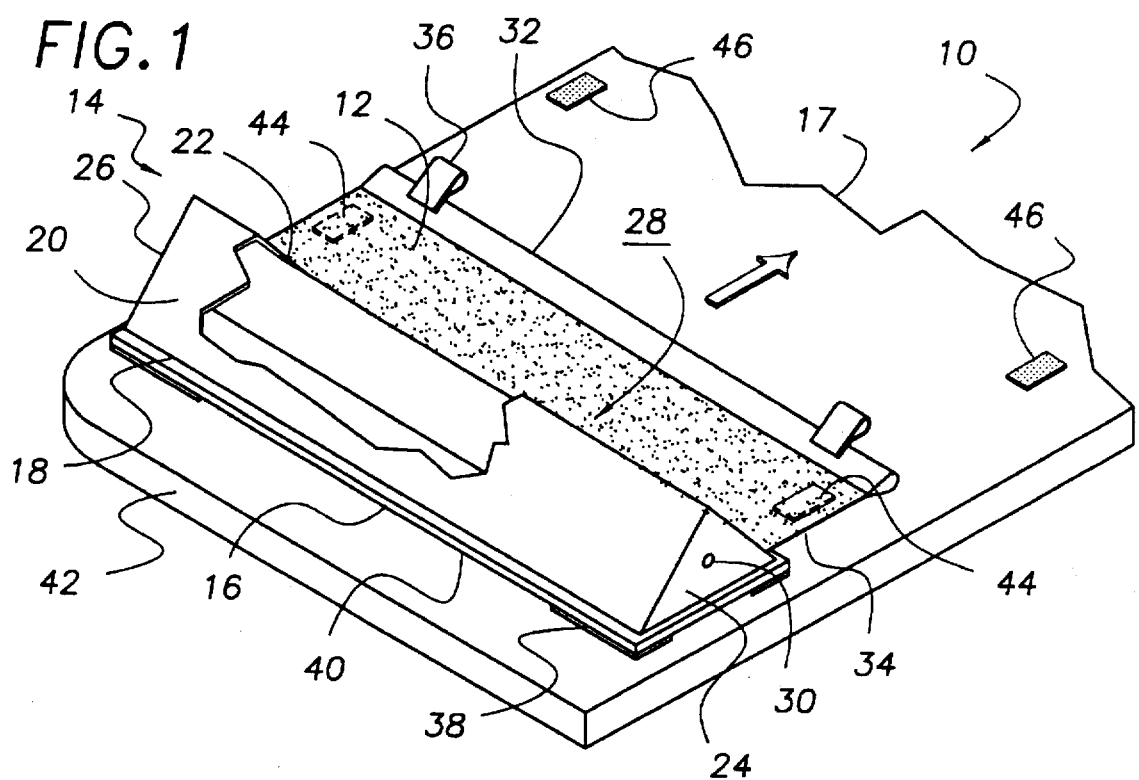
FIG. 1 is a perspective view of an exemplary embodiment of the automobile shade assembly of the present invention.

FIG. 1 is a perspective view of an exemplary embodiment of the automobile shade assembly of the present invention generally designated by the numeral 10. Automobile shade assembly 10 includes a sun shade 12 retractably mounted within a housing 14 and a mounting plate 16 for detachably connecting housing 14 to an automobile window 17.

Housing 14 is triangular in shape and constructed of plastic. Housing 14 includes a base wall 18, a top wall 20 and a front wall 22 interconnected by a first sidewall 24 at one end and a second sidewall 26 at the opposite end thereof. Top wall 20 extends substantially at a right angle from base wall 18, front wall 22 interconnects base wall 18 and top wall 20. Housing 14 forms a slit 28 therethrough approximate the intersection of base wall 18 and front wall 22 extending substantially from first sidewall 24 to second sidewall 26.

An axle 30 is rotatably mounted within housing 14 between first and second sidewalls 24, 26. A retraction mechanism (not shown) being a spring mechanism well known in the art, is connected to axle 30 and housing 12 urging axle 30 in a first angular direction.

Sun shade 12 is constructed of a substantially rectangular sheet of flexible material having a rear edge (not shown), a forward edge 32 and a reflective surface 34. The rear edge of sun shade 12 is connected to axle 30 with forward edge 32 extending through slit 28. The spring mechanism urges axle 30 in a first angular direction tending to roll sun shade 12 thereon, retracting sun shade 12 into housing 14. Sun shade 12 is extended from housing 14 by pulling tabs 36 connected to forward edge 32 away from housing 14.

Mounting plate 16 is a rectangular piece of transparent plastic and is sized substantially identical to base wall 18 of housing 14. Mounting plate 16 is adapted for mounting to window 17 by placing double sided adhesive tape 38 between the first plate side 40 of plate 16 and window 17. Housing 14 is detachably connectable to mounting plate 16. As shown in FIG. 1, mounting plate 16 and housing 14 are connected substantially parallel to and adjacent a lateral edge 42 of the interior of window 17.

Sun shade 12 is used to shield the interior of an automobile from the ultra-violet rays of the sun by extending sun shade 12 from housing 14, in the direction shown by the arrow, with reflective surface 34 of shade 12 facing outwardly from the interior of the automobile. Sun shade 12 is removably fastenable to window 17 by first fasteners 44 and second fasteners 46. First fasteners 44 (shown as hidden lines) are hook fasteners attached to reflective surface 34 of sun shade 12 approximate the forward edge 32 thereof. Second fasteners 46 are pile fasteners attached to window 17 by adhesive and are interconnectable with first fasteners 44.

Figure 2:
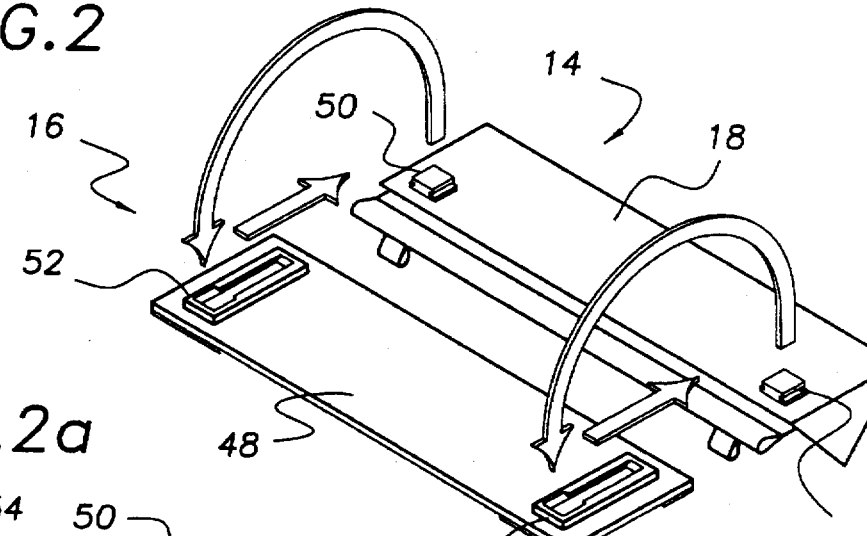
FIG. 2 is a perspective view of a first connector and a second connector in isolation.

FIG. 2 is a perspective view of the second plate side 48 of mounting plate 16 and base wall 18 of housing 14 in isolation. The figure shows the mechanism for detachably connecting housing 14 to mounting plate 16.

Housing 14 is detachably connectable to mounting plate 16 by a pair of first connectors 50 interconnectable with a pair of second connectors 52. First connectors 50 are substantially rectangular members extending from base wall 18 of housing 14. Second connectors 52 extend outwardly from second plate side 48 of mounting plate 16. Second plate side 48 is opposite first plate side 40 of mounting plate 16.

Figure 2A:
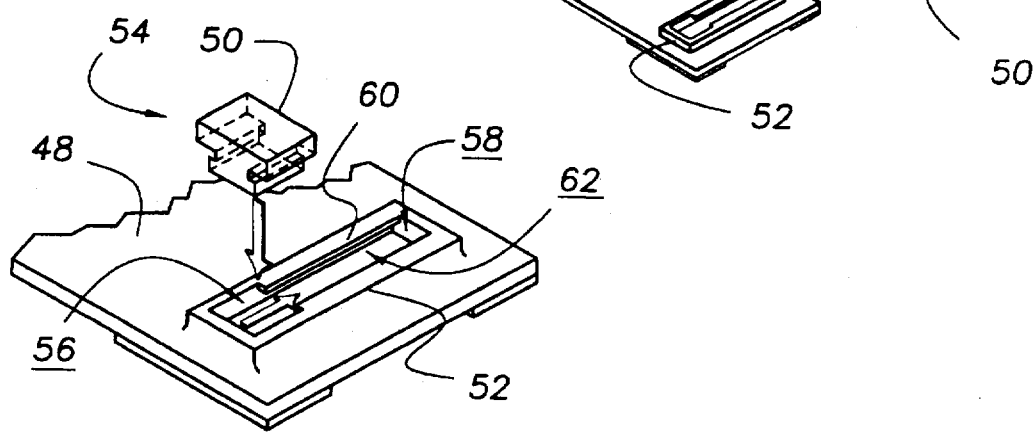
FIG. 2A is a perspective view of the second plate side of the mounting plate and the base wall of the housing in isolation.

FIG. 2A is a perspective view of a first connector 50 and a second connector 52 in isolation. First connector 50 forms a slot 54 about its perimeter approximate the midpoint thereof.

Second connector 52 defines a T-shaped recess having a first rectangular section 56 and a second elongated section 58. First rectangular section 56 is adapted for disposing first connector 50 therein, as shown by the dashed line. Second elongated section 58 extends perpendicularly from first rectangular section 56. A lip 60 extends about the perimeter of second elongated section 58 defining a trackway 62 between second plate side 48 of mounting plate 16 and lip 60.

Referring to FIGS. 2 and 2A, housing 14 is detachably connected to mounting plate 16 by inserting each first connector 50 into a first rectangular section 56 of a second connector 52, then sliding housing 14 so that first connector 50 is moved into second elongated section 58 entrapping lip 60 in slot 54 of first connector 50, as shown by the arrows, interconnecting housing 14 and mounting plate 16. First connectors 50 and second connectors 52 are aligned so that when interconnected housing 14 is substantially centered on mounting plate 16 as shown in FIG. 1.

Use of automobile shade assembly 10 is now described with reference to FIGS. 1, 2 and 2A. First plate side 40 of mounting plate 16 is attached substantially parallel and adjacent to lateral edge 42 of the interior of window 18 by adhesive 38. Housing 14 is detachably connected to mounting plate 16, as described above, with top wall 20 of housing 14 adjacent lateral edge 42 of window 17 and front wall 22 sloping downwardly towards window 17. Second fasteners 46 are spaced from housing 14 and adhered to window 17 and distance such that a substantial portion of window 17 is covered by sun shade 12 when first and second fasteners 44, 46 are interconnected. In a singular application, second fasteners 46 are connected adjacent the edge of window 17 opposite lateral edge 42. When it is desired to block the sun's rays from the interior of the vehicle, sun shade 12 is extended from housing 12 by pulling tabs 36 with reflective surface 34 facing outwardly from the interior of the vehicle, sun shade is then secured covering window 17 by interconnecting first fasteners 44 and second fasteners 46. When it is desired to uncover window 17, first and second fasteners 44, 46 are disconnected and sun shade 12 is retracted into housing 14 upon axle 30 by the spring mechanism.

It can be seen from the preceding description that a device for shielding the interior of an automobile from solar radiation which has a sun shade retractable mounted within a housing that is detachably mountable to an automobile window, has a housing for storing the retractable sun shade that presents a low profile thereby not obstructing the view of the driver of a vehicle when the sun shade is retracted, has a housing containing the retractable sun shade that may be easily and quickly connected to any of the windows in a vehicle depending on the direction of the sun's rays, and is inexpensive to manufacture and easy to install without having bulky frameworks which impair a driver's view while driving and electrical connections, while, providing an automobile shade which has all the advantages of the prior art and none of the disadvantages has been provided.

It is noted that the embodiment of the automobile shade assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An automobile shade assembly comprising:

a mounting plate having a first plate side and a second plate side, said mounting plate being adapted for mounting to the interior of a window of an automobile;

a housing having a triangular cross-section, a base wall, a top wall, a front wall, a first sidewall and a second sidewall, said top wall extending substantially at a right angle from said base wall, said front wall interconnecting said base wall and said top wall, said base wall, said top wall and said front wall being interconnected by said first sidewall and said second sidewall at opposite ends of said housing;

a slit formed by said housing approximate the intersection of said base wall and said front wall, said slit extending substantially from said first sidewall to said second sidewall;

an axle having a retraction mechanism connected thereto, said axle rotatably mounted within said housing between said first sidewall and said second sidewall in a manner such that said retraction mechanism urges said axle in a first angular direction;

a flexible sun shade adapted for reflecting the sun's radiation, said sun shade having a rear edge connected to said axle and a forward edge extending through said slit in said housing, said rear edge being connected to said axle in a manner such that said first angular direction of said axle urges said sun shade to retract within said housing by rolling upon said axle;

means for detachably connecting said housing to said mounting plate, said detachable connecting means including:

a first connector extending from said base wall of said housing, said first connector being substantially rectangular, said first connector forming a slot about its perimeter approximate the midpoint thereof; and a second connector extending outwardly from said second plate side of said mounting plate, said second connector forming a T-shaped recess having a first rectangular section adapted for disposing said first connector therein and a second elongated section having a lip extending about the perimeter thereof defining a trackway between said lip and said second plate side in a manner such that when said first connector is disposed within said first rectangular section and urged into said second elongated section said lip is entrapped within said slot formed by said first connector interconnecting said housing and said mounting plate; and means for removably fastening said sun shade to said automobile window when said sun shade is extended from said housing.

2. An automobile shade assembly comprising:

a mounting plate having a first plate side and a second plate side, said mounting plate being adapted for mounting to the interior of a window of an automobile;

a housing having a triangular cross-section, a base wall, a top wall, a front wall, a first sidewall and a second sidewall, said top wall extending substantially at a right angle from said base wall, said front wall interconnecting said base wall and said top wall, said base wall, said top wall and said front wall being interconnected by said first sidewall and said second sidewall at opposite ends of said housing;

a slit formed by said housing approximate the intersection of said base wall and said front wall, said slit extending substantially from said first sidewall to said second sidewall;

an axle having a retraction mechanism connected thereto, said axle rotatably mounted within said housing between said first sidewall and said second sidewall in a manner such that said retraction mechanism urges said axle in a first angular direction;

a flexible sun shade adapted for reflecting the sun's radiation, said sun shade having a rear edge connected to said axle and a forward edge extending through said slit in said housing, said rear edge being connected to said axle in a manner such that said first angular direction of said axle urges said sun shade to retract within said housing by rolling upon said axle;

means for detachably connecting said housing to said mounting plate, said detachable connecting means including:

a first connector extending from said second plate side of said mounting plate, said first connector being substantially rectangular, said first connector forming a slot about its perimeter approximate the midpoint thereof; and a second connector extending outwardly from said base wall of said housing, said second connector forming a T-shaped recess having a first rectangular section adapted for disposing said first connector therein and a second elongated section having a lip extending about the perimeter thereof defining a trackway between said lip and said base wall in a manner such that when said first connector is disposed within said first rectangular section and urged into said second elongated section said lip is entrapped within said slot formed by said first connector interconnecting said housing and said mounting plate; and means for removably fastening said sun shade to said automobile window when said sun shade is extended from said housing.

* * * * *